United States Patent Office 3,018,255
Patented Jan. 23, 1962

3,018,255
VANADIUM OXIDE CATALYST FOR PRODUCTION OF SOLID POLYMERS
Robert L. Banks, Bartlesville, Okla., assignor to Phillips Petroleum Company, a corporation of Delaware
No Drawing. Filed June 26, 1958, Ser. No. 744,682
5 Claims. (Cl. 252—455)

This invention relates to a process for polymerization of ethylene to normally solid polymers in the presence of a vanadium-oxide containing catalyst. In another aspect, this invention relates to a method of preparing a catalyst which is suitable for use in the polymerization of ethylene to normally solid polymer. In still another aspect, this invention relates to a vanadium oxide-containing catalyst which can be used in the preparation of solid polyethylenes.

Solid polymers of ethylene have gained considerable commercial importance and have wide utility in the fields of packaging, protective covering and molded articles. Films, sheets, containers and the like, which are highly impermeable to moisture can be readily prepared from solid polymers of ethylene.

I have discovered a method of making solid polyethylene and a unique method of preparing a vanadium oxide catalyst by impregnating a silica-alumina support with vandyl oxalate, or other vanadium salts of organic acids, and activating the resulting impregnated support by heating at 1100 to 1600° F. for a period of at least 30 minutes in an oxygen-containing atmosphere. When ethylene is contacted under polymerization conditions with a catalyst prepared by the method of this invention, a solid polymer results. The production of solid polyethylene in this instance is quite surprising in view of the fact that vanadium-containing catalyst activated under reducing rather than oxidizing conditions, or even at lower temperatures, produced no solid polymer.

It is an object of my invention to provide a method of preparing a solid polymer of ethylene.

Another object of my invention is to provide a vanadium oxide-containing catalyst which can be used to polymerize ethylene to a normally solid polymer.

Still another object of my invention is to provide a method by which such a catalyst can be prepared.

Other objects, features and advantages of this invention will be apparent to those skilled in the art from the following discussion and the claims.

The catalyst of this invention is prepared by impregnating a silica-alumina support with vanadyl oxalate or other vanadium salts of organic acids, and activating in an oxidizing atmosphere at 1100 to 1600° F. While the term "support" is used to designate the silica-alumina portion of my catalyst, it is not meant to infer that this portion is inert since the activity of the total catalyst is affected by the nature and composition of the support. The amount of silica in the silica-alumina portion can range from 5 to 99 weight percent but is preferably in the range of about 80 to 95 weight percent with from 5 to 20 weight percent alumina. The silica-alumina portion should be a porous material, e.g. a gel, suitable for impregnation. Commercially available cracking catalysts containing silica and alumina in the prescribed ratios are quite suitable.

The support is impregnated with vanadyl oxalate, or other vanadium salts of organic acids, preferably in an aqueous solution in sufficient concentration to produce a finished catalyst having from 0.5 to 10 weight percent vanadium based on the total weight of the catalyst. For maximum activity it is preferred that the vanadium content of the catalyst be in the range of from 1 to 5 weight percent. By vanadium salts of organic acids I mean such salts as vanadium oxalate, vanadium malonate, vanadium formate, vanadium acetate, vanadium citrate and vanadium tartrate. The silica-alumina is mixed with the aqueous solution of vanadyl oxalate, or other vanadium salts of organic acids, for a sufficient length of time to allow thorough impregnation. The excess solution is then removed and the catalyst is dried.

The impregnated catalyst is activated by heating at an elevated temperature for a sufficient length of time to increase the activity of the catalyst. This activation is effected in an oxidizing atmosphere at calcining temperatures of at least 1100° F. to not substantially greater than 1600° F. The time of activation can vary over a broad range depending upon the temperature employed. Generally, the period of activation is at least 30 minutes and preferably from about 2 to 10 up to 24 hours. The gas with which the catalyst is contacted during activation contains oxygen and is substantially free of water, for example, having a dewpoint below 75° F. and preferably below 0° F.

The finished catalyst must contain at least a portion of pentavalent vanadium as the oxide, e.g., the vanadium must have an average valence greater than 4, e.g., 4.5 and preferably will have an average valence of at least 4.8.

The polymerization reaction of my invention can be carried out by contacting ethylene with the catalyst, prepared as described above, under polymerizing conditions. The process can be conducted in either the gas phase or the liquid phase using a diluent and with the catalyst in a fixed bed, moving bed, fluidized bed or as a slurry in the diluent. The temperature of the polymerization is broadly within the range of about 100 to 500° F., but the preferred range is at least 150° F. and generally does not exceed 375° F. The pressure can vary from atmospheric for vapor phase reactions to 700 p.s.i.a., or higher if desired. When a diluent is employed, the pressure is sufficient to maintain the diluent in the liquid phase and to dissolve sufficient ethylene in the diluent. Generally the pressure of the reaction is at least 100 to 300 p.s.i. and is not over 500 p.s.i. in most instances.

A liquid phase process is preferred in which a hydrocarbon diluent which is liquid, inert and nondeleterious under the reaction conditions is employed. Paraffinic and naphthenic hydrocarbons having from 3 to 12, preferably 5 to 12 carbon atoms per molecule can be utilized. Examples of such diluents are propane, isobutane, isooctane, cyclohexane and methyl cyclohexane. The feed rate can range from 0.1 to 20 liquid hourly space velocity with a preferred range of 1 to 6 liquid hourly space velocity in a liquid phase process with a fixed bed catalyst. In a liquid phase process in which the catalyst is present as a slurry in the diluent the amount of catalyst based on the diluent is in the range of 0.01 to 10 weight percent. In a moving bed process the feed rate is about 2 to 6 v./v./hours with the ethylene concentration in the range of 0.1 to 25 weight percent and the catalyst rate from 0.1 to 0.5 v./v./hour.

The solid polyethylene is formed either as a deposit on the catalyst or in solution in the liquid diluent and can be recovered from solution by precipitation, such as by cooling the solution or by evaporating the solvent. Ordinarily the catalyst is filtered from the solution before precipitation but in certain applications, for example, when the polymer is to be pigmented with carbon black, the catalyst can be allowed to remain in the solid polymer.

Advantages of this invention are illustrated by the following examples. The reactants, and their proportions, and other specific conditions are presented as being typical and should not be construed as limiting the invention unduly.

Example I

Two liters of impregnating solution was prepared by adding 124 grams of vanadyl oxalate and 250 cc. of 70 percent nitric acid to distilled water. After dissolving the vanadyl oxalate, 1200 cc. of this solution was added to 1000 cc. of commercial silica-alumina (Nalcat cracking catalyst, 86.5 weight percent silica—13.5 weight percent alumina). The mixture was stirred several times over a 15 minute period. The excess solution was removed by filtering and the impregnated catalyst was dried in an evaporating dish on a hot plate. One hundred fifty cc. of this catalyst was activated with air at 1300° F. for four hours. The average vanadium valence was 4.92 and the vanadium content of the catalyst was 1.91 weight percent. Five and 47/100 (5.47) grams of the activated catalyst along with 300 grams of cyclohexane was charged to a one-liter reactor equipped with an internal stirrer. The stirrer was started and the reactor heated to 200° F. Ethylene was then added and the reaction conditions were maintained at 200–300° F. and 450 p.s.i.g. for 1¼ hours. The reactor was opened and 18.3 grams of solid polymer plus catalyst was recovered. Yield was $$\frac{18.3 - 5.5}{5.47} = 2.32 \text{ grams polymer per gram catalyst}$$

This sample shows that solid polymer is produced with a vanadium oxide catalyst containing penta-valent vanadium.

Example II

Another catalyst was prepared in the manner described in Example I except using a different commercial silica-alumina base (low Density Davison cracking catalyst, 13 weight percent alumina—87 weight percent silica). After activation at 1300° F. in the presence of air, the catalyst had a total vanadium content of 2.52 weight percent and an average vanadium valence of 4.73. This catalyst when used for polymerizing ethylene as in Example I gave a yield of 0.6 gram solid polymer per gram of catalyst.

This example also shows solid polymer is produced with vanadium oxide containing catalyst but with a lower average valence, the yield per gram was not as great as in Example I.

Example III

A portion of the activated catalyst from Example II was reduced with hydrogen at 950° F. for 17½ hours. The average valence was 3.55. When ethylene was treated with this catalyst as in Example I, no solid polymer was formed.

Example IV

A catalyst was prepared as in Example II except that activation was at 950° F. When ethylene was treated with this catalyst as in Example I, no solid polymer was formed. This example shows that activation at this low temperature is insufficient to produce an operable catalyst. In my copending application having Serial No. 724,510, filed March 28, 1958, now U.S. Patent No. 2,986,557, it is shown that a catalyst prepared by impregnating a silica-alumina of the type used in Example II of this application with vanadyl sulfate ($VOSO_4 \cdot 2H_2O$) and activated at 950° F. produced solid polymer when ethylene was treated in a manner as shown by Example I of this application.

This Exmple IV then shows that a higher activating temperature is required to activate the vanadium-oxide catalyst of this invention than is required for other vanadium salts, e.g., vanadium sulfate.

As will be evident to those skilled in the art, various modifications of this invention can be made, or followed, in the light of this foregoing disclosure and discussion, without departing from the spirit or scope thereof.

I claim:

1. A method of preparing a catalyst useful in the polymerization of ethylene to a normally solid polymer which comprises impregnating a silica-alumina support with a vanadium salt of an organic acid convertible to the oxide upon heating, said salt being selected from the group consisting of vanadium oxalate, vanadium malonate, vanadium formate, vanadium acetate, vanadium citrate and vanadium tartrate, and activating the impregnated catalyst by heating in an oxygen-containing atmosphere at a temperature in the range 1100 to 1600° F. for a period of time sufficient to convert the salt to the oxide.

2. A method of preparing a catalyst useful in the polymerization of ethylene to a normally solid polymer which comprises mixing silica-alumina cracking catalyst with an aqueous solution of a vanadium salt of an organic acid which is converted to the oxide upon heating, said salt being selected from the group consisting of vanadium oxalate, vanadium malonate, vanadium formate, vanadium acetate, vanadium citrate and vanadium tartrate, drying the thus treated silica-alumina catalyst thereby forming a catalyst impregnated with the vanadium salt, and heating the impregnated catalyst in an oxygen-containing atmosphere at a temperature in the range 1100 to 1600° F. until the salt has been converted to the oxide.

3. A method of preparing a catalyst useful in the polymerization of ethylene to a normally solid polymer which comprises mixing a porous silica-alumina support containing from 5 to 99 weight percent silica and from 1 to 95 weight percent alumina with an aqueous solution of a vanadium salt of an organic acid, said salt being selected from the group consisting of vanadium oxalate, vanadium malonate, vanadium formate, vanadium acetate, vanadium citrate and vanadium tartrate, in sufficient concentration to provide an impregnated catalyst having from 0.5 to 10 weight percent vanadium based on the total catalyst weight; drying the thus treated support thereby forming a catalyst impregnated with the vanadium salt; and heating the thus impregnated catalyst in an oxygen-containing atmosphere at a temperature in the range 1100 to 1600° F. for at least 30 minutes.

4. The method of claim 3 wherein said silica-alumina support contains from 80 to 95 weight percent silica and from 5 to 20 weight percent alumina and the finished catalyst contains from 1 to 5 weight percent vanadium as the oxide.

5. The method of claim 3 wherein the vanadium salt is vanadyl-oxalate.

References Cited in the file of this patent

UNITED STATES PATENTS

| | | |
|---|---|---|
| 2,086,542 | Douglass | July 13, 1937 |
| 2,394,515 | Goshorn | Feb. 5, 1946 |
| 2,674,582 | Darby | Apr. 6, 1954 |
| 2,762,791 | Pease | Sept. 11, 1956 |
| 2,809,939 | Dixon | Oct. 15, 1957 |
| 2,838,558 | Hadley et al. | June 10, 1958 |
| 2,843,577 | Friedlander et al. | July 15, 1958 |